3,325,177
TRANSPORT DEVICES FOR LIQUID AND
PULVERULENT MATERIAL
Gustav Arthur Welinder, Lockarp, Sweden, assignor to
A. B. Interconsult, Malmo, Sweden
Filed Jan. 10, 1966, Ser. No. 519,800
Claims priority, application Sweden, Jan. 20, 1965,
700/65
2 Claims. (Cl. 280—5)

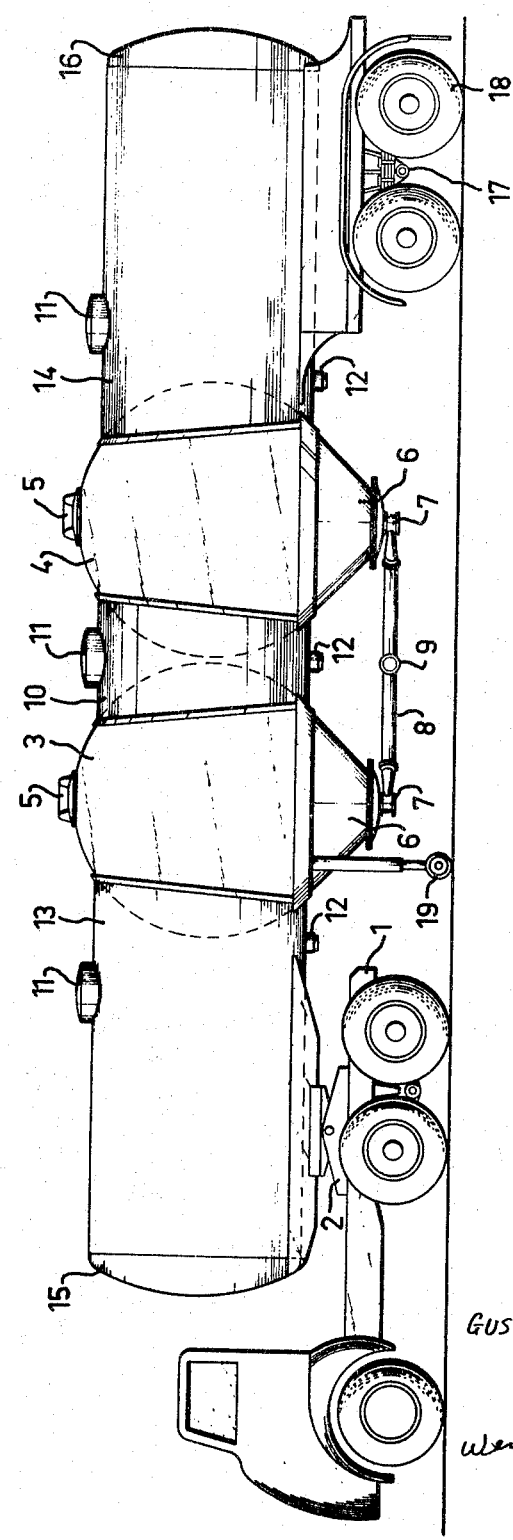

There have been suggested transport devices comprising one or more substantially spherical containers from which liquid or pulverulent material is emptied by compressed air, and means secured to the walls of the container or containers and forming therewith a beam which is supported by a vehicle and/or equipped with wheels of its own. In these prior-art transport devices the said means have had the shape of bars, plates and similar members to form together with the containers a three-dimensional framework. These prior-art transport devices have been widely used for the transport of liquid or pulverulent material which has to be emptied from the container or containers by compressed air. The necessity of using compressed air for the emptying is the reason why the container or containers have to be given a substantially spherical shape, as the use of other container shapes, e.g., cylindrical, would make it necessary with regard to the requisite pressure above atmospheric at the emptying operation to provide such a container wall thickness that the weight of the transport device in empty state would become considerably higher than with the use of spherical containers of the same volume, which would result in a greatly impaired transport economy.

It has now been established in practice that the transport of liquid and pulverulent material which necessitates the use of compressed air for emptying it from the container, often takes place but in one direction, i.e., from one place to another, so that the transport device must return empty, thus impairing the transport economy. In many cases it has been found that it would be possible to secure return freights of liquid that does not require emptying by compressed air, but one realized that such a procedure would be uneconomical considering that the containers would have to be cleaned after being emptied.

The present invention solves the problem of improving the transport economy in such cases. The invention thus relates to a transport device of the type outlined in the introduction, and is characterized by the fact that said means are constituted by a plurality of preferably substantially cylindrical shell walls which are fixed to and project in opposite directions from the container or each of the containers arranged in a row and are closed at their ends facing away from the container or containers by end walls to provide a plurality of vessels for the transport of liquid.

When exploiting the invention it is thus possible to transport liquid or pulverulent material that requires emptying by compressed air from one place to another in the substantially spherical container or containers and to secure return freight of liquid that does not require emptying by compressed air in that said liquid is filled into the said vessels having preferably substantially cylindrical shell walls. With such a procedure the vessels need not be cleaned after emptying, and good transport economy is thereby obtained.

The invention will be described more in detail in the following, reference being had to the accompanying drawing, which diagrammatically shows by way of example a transport vehicle constructed in accordance with the invention.

The transport vehicle illustrated in the drawing consists of a draft vehicle 1 and a semi-trailer hung at 2 in conventional manner on said draft vehicle and forming the transport device proper of the invention. The semi-trailer has two substantially spherical containers 3, 4 which are provided at the top with a fill opening which is closed by a cover 5 and at the bottom have a conical bottom portion 6 with a prior-art emptying device 7 for emptying said containers 3, 4 of liquid or pulverulent material by compressed air through a tube 8 interconnecting the containers and having a pipe or hose connection 9 for carrying away the material. The containers 3, 4 are interconnected by a preferably substantially cylindrical shell wall 10 which in a suitable manner, e.g., by welding is secured in a liquid-tight manner to the outside of the substantially spherical walls of the containers 3, 4, said spherical walls thus closing the ends of the shell 10 so that there is formed between the containers 3, 4 a vessel for liquid. At the top this vessel has a dome 11 which in conventional manner can have devices for filling liquid into the vessel and devices for supplying and discharging air when the vessel is filled and emptied. At the bottom the vessel has a drain 12. Diametrically opposed to the shell 10 there projects from each container 3, 4 a likewise preferably substantially cylindrical shell wall 13 and 14, respectively, which has its end facing away from the container closed by an end wall 15 and 16, respectively, so that there are formed two further vessels for the transport of liquid which can be discharged from the vessels without the use of compressed air. Like the shell wall 10, the shell walls 13 and 14 have a dome 11 and a drain 12. The shells 13, 14 are secured to the containers 3, 4 in the same way as the shell 10, and the three shells are coaxial.

Together with the containers 3, 4 the shells 10, 13 and 14 constitute a beam which adjacent the free end of the shell 13 is supported at 2 on the draft vehicle 1 and which is provided within the area of the shell 14 with a two-axle undercarriage 17 having four wheels 18. Further, a support wheel 19 can be provided to support the beam when it is detached from the draft vehicle 1.

Although the shells 10, 13, 14 should preferably be purely cylindrical they may also be constructed with oval cross-sectional shape. In the embodiment shown two substantially spherical containers 3, 4 are provided, but as is readily seen it is possible to employ more than two spherical containers having shells between them corresponding to the shell 10, or a single spherical container from which two shells corresponding to the shells 13 and 14 project in opposite directions.

What I claim and desire to secure by Letters Patent is:
1. A transport device comprising substantially spherical wall means of first container means for flowable matter adapted to be emptied from said first container means by compressed air, substantially cylindrical wall means of a plurality of second container means for liquid matter, said substantially cylindrical wall means being fixed to and projecting in opposite directions from said substantially spherical wall means in axial alignment, end wall means fixed to and closing the free ends of said substantially cylindrical wall means facing away from said substantially spherical wall means, said substantially spherical and cylindrical wall means forming together a self-supporting and container load supporting beam, vehicle wheels, and supporting means supporting said beam on said vehicle wheels at spaced points along said beam.

2. A transport device according to claim 1, in which said supporting means are located in the neighborhood of said end wall means and spaced from said substantially spherical wall means.

References Cited

UNITED STATES PATENTS

| | | | |
|---|---|---|---|
| 2,108,416 | 2/1938 | Smith et al. | 105—247 |
| 2,616,758 | 11/1952 | Meyers | 105—248 X |
| 2,901,133 | 8/1959 | Weller | 214—83.28 |
| 3,058,753 | 10/1962 | Carlsen | 280—5 |
| 3,080,173 | 3/1963 | Johnson | 280—5 |
| 3,139,286 | 6/1964 | Johnson | 280—5 |

FOREIGN PATENTS

| | | |
|---|---|---|
| 1,091,454 | 10/1954 | France. |
| 971,734 | 3/1959 | Germany. |

LEO FRIAGLIA, *Primary Examiner.*